Patented Dec. 21, 1937

2,103,221

UNITED STATES PATENT OFFICE 2,103,221

OXIDATION CATALYSTS AND PROCESS

Leslie G. Jenness, Brooklyn, N. Y., assignor to Intermetal Corporation, Newark, N. J., a corporation of Delaware No Drawing. Application November 14, 1935, Serial No. 49,821

3 Claims. (Cl. 23—234)

This invention relates to an oxidation catalyst and process, and more particularly to a catalyst and process of making a catalyst capable of oxidizing carbon monoxide from gases containing hydrogen without oxidizing the hydrogen, and to the process of oxidizing carbon monoxide. The invention has particular utility in the manufacture of hydrogen which is free from carbon monoxide by converting the carbon monoxide into carbon dioxide.

There are several processes for producing gases containing hydrogen in relatively large quantities and at low cost. Examples of such processes are the contacting of water gas, prepared by passing steam over hot coal or coke, with a catalyst, usually of promoted iron oxide. In this reaction, the water of the steam reacts with the carbon monoxide to form carbon dioxide and hydrogen. This reaction, however, is incomplete, and an equilibrium is reached when one or two per cent carbon monoxide remains in the gas. The so-called steam-iron process has also been employed, in which steam is passed over iron reduced from an oxide by water gas to re-oxidize the iron and liberate hydrogen. The reduction of the original iron oxide with water gas results in the formation of carbides in the reduced iron which, in the steam-iron process, supply carbon to form carbon monoxide in the resultant gas.

Another process for manufacturing hydrogen involves the passing of a hydrocarbon gas and steam over a catalyst, usually nickel, to form carbon dioxide and hydrogen along with a small proportion, approximately 1%, of carbon monoxide. All of these processes result in a mixture of gases containing approximately 50% to 95% hydrogen and .05% to 2% carbon monoxide, the remainder being gases, predominantly carbon dioxide, which are inert or which can be removed by comparatively simple scrubbing processes.

In many processes employing hydrogen, the presence of carbon monoxide is either undesirable or renders the process commercially impractical. For example, in the hydrogenation of glyceride oils or the synthesis of ammonia, carbon monoxide poisons the catalyst and quickly renders it inoperative. In such processes, it has been found necessary to resort to expensive scrubbing operations to remove the carbon monoxide, such as scrubbing at 200 atmospheres with aqueous solutions of cuprous ammonium carbonate or formate or to use an electrically produced hydrogen.

In accordance with the present invention, the carbon monoxide admixed with the hydrogen in gases resulting from the above discussed processes of low cost production of hydrogen is substantially completely oxidized without appreciable oxidation of hydrogen. The oxidation of carbon monoxide in the presence of non-oxidizable gases presents no difficulty since many oxides are capable of effecting this result, and also no difficulty is presented in the partial oxidation of carbon monoxide where an equilibrium reaction obtains as, for example, in the water gas reaction. However, in oxidizing the remaining carbon monoxide from hydrogen, the rate of reaction must be carefully controlled and the heat produced by this exothermic reaction must be dissipated without raising the temperature of the reaction to the point at which hydrogen begins to oxidize. The oxidation of hydrogen is, of course, also exothermic, and if appreciable amounts of hydrogen are oxidized, the temperature of the reaction becomes uncontrollable. This temperature progressively increases at a rapid rate until the oxide catalyst employed becomes incandescent and its oxidizing properties are destroyed. By controlling the rate of reaction and dissipating the heat from the reaction, the oxidation of the carbon monoxide in the presence of hydrogen can be carried out continuously or intermittently without excessive heat and destruction of the catalytic oxide.

It is, therefore, an object of the present invention to provide a catalyst and process by which the rate of oxidation of carbon monoxide and the temperature of reaction are easily controlled.

Another object of the invention is to provide a catalytic oxide and process of oxidizing carbon monoxide in the presence of hydrogen at a relatively rapid rate without overheating.

Another object is to provide an oxide and process of employing the same for oxidizing carbon monoxide in the presence of hydrogen wherein the temperature of reaction is easily controlled.

Another object of the invention is to provide a process of catalytic oxidation of carbon monoxide in the presence of hydrogen in which the heat of reaction is rapidly dissipated from the reaction zone.

A further object of the invention is to provide an oxide which will oxidize carbon monoxide in the presence of hydrogen at a relatively rapid rate without overheating and without oxidizing hydrogen.

A still further object of the invention is to provide a manganese oxide which is capable of selectively oxidizing carbon monoxide in the presence of hydrogen and which has improved heat conductivity properties.

Other objects and advantages of the invention will appear in the following description of the preferred embodiments of my invention.

The oxide of the present invention for selectively oxidizing carbon monoxide in the presence of hydrogen comprises in general a manganese oxide in an intermediate stage of oxidation or partially hydrated and admixed with a metallic powder and formed into granules. In my prior application, Serial No. 4,095, filed January 30, 1935, I have disclosed a manganese oxide capable of preferentially oxidizing carbon monoxide in the presence of hydrogen at temperatures between approximately 100° and 178° C. This oxide was prepared by partially reducing $MnO_2$ under carefully controlled conditions either with a small quantity of reducing gas such as carbon monoxide or hydrogen mixed with inert gases or with an extremely small flow of a reducing gas or mixtures thereof such as carbon monoxide and hydrogen. Specifically, this oxide was produced by reducing a charge of manganese dioxide made according to my Patent No. 1,937,488, which oxide was pressed while still in a wet condition into a coherent mass and broken up into particles ranging in size from one-fourth to one-half inch in diameter and dried at temperatures from 85° to 90° C. for a period of sixteen hours, and then dried at 200° C. until no further loss in weight occurred. This oxide was reduced by a small quantity of carbon monoxide, about 1% mixed with approximately 99% of carbon dioxide or other inert gas, the temperature being maintained between 125° and 135° C. The resultant oxide could be used to oxidize carbon monoxide in the presence of hydrogen without oxidizing hydrogen.

It was further disclosed that a partially hydrated oxide found by drying the above mentioned pressed particles at a somewhat lower temperature, for example, 110° to 115° C., could be used after a pretreatment stage under the same conditions as in the process of oxidation of carbon monoxide for the selective oxidation of carbon monoxide in the presence of hydrogen. After this partially hydrated oxide has been pretreated, it assumes the same form as the completely dried and partially reduced oxide of the first method of preparation. In either case the final product is a manganese oxide having a chemical composition which lies somewhere between $MnO_2$ and $Mn_3O_4$, probably constituting mixtures of manganese oxides in varying degrees of oxidation, and may contain some $MnO_2$ in the interior of the catalyst particles. For efficient operation the available oxygen of the oxide should be approximately 10%.

By "available oxygen", I refer to the standard meaning of the term, that is, the portion of the total compound or mixture which is available for and capable of oxidizing an acidic solution of ferrous sulphate or oxalic acid. The available oxygen for efficient operation may also be expressed in terms of the atoms of available oxygen per atom of manganese. This ratio should be more than one third of an atom and less than one atom of available oxygen per atom of manganese.

This catalyst or oxide may be employed to continuously oxidize the carbon monoxide in the presence of hydrogen by supplying, along with the gases being passed over the oxide, sufficient oxygen to provide an excess of 30 to 100% over that necessary to combine with the carbon monoxide by maintaining the temperature of the reaction between approximately 100° and 175° C. and preferably between 120° and 130° C. This temperature may be maintained by heating or cooling the catalytic bed, depending upon the percentage of carbon monoxide being oxidized, and upwards of 1% of carbon monoxide may be oxidized without increasing the temperature above the point at which hydrogen begins to oxidize (175° to 200° C.).

As disclosed in my copending application Serial No. 9,264, filed March 4, 1935, this catalyst may also be employed for intermittent oxidation of carbon monoxide in the presence of hydrogen by passing the mixture of gases, including hydrogen and carbon monoxide, over the oxide without additional oxygen at temperatures ranging between 100° and 175° C., whereby the oxide is reduced and the carbon monoxide converted to carbon dioxide. This step is then followed by a reoxidizing of the oxide by passing air or oxygen therethrough with the temperature maintained substantially the same as for the oxidation of carbon monoxide, such that the amount of available oxygen fluctuates between the limits above specified. In either the continuous or intermittent process above described, gases containing upwardly of 1% of carbon monoxide and large proportions of hydrogen can be treated to convert the carbon monoxide to carbon dioxide without oxidation of hydrogen.

I have now found that, by mixing metallic powders with the manganese dioxide prior to compressing and drying, gases containing larger quantities of carbon monoxide can be treated without increasing the temperature above the point at which hydrogen begins to oxidize. Also the time necessary to reduce a large mass of catalyst granules to the desired composition is greatly reduced, and a low temperature can be more easily and uniformly maintained during this treatment. During the subsequent use of the catalyst granules for the preferential oxidation of carbon monoxide, the catalytic mass can be subjected to more violent alterations in carbon monoxide content of the gas being treated without danger of reaching local temperatures above the point at which hydrogen begins to oxidize, which oxidation of hydrogen would cause the temperature to still further increase with more oxidation of hydrogen until the high temperature spreads throughout the oxide bed and destroys the operation of the oxide. Furthermore, cooling devices placed within the catalytic bed can be effectively employed since the heat is rapidly conducted through the oxide to the cooling devices, and gases containing carbon monoxide concentrations which will develop more heat than the gases themselves can remove can be treated.

In preparing catalysts or oxides according to the present invention, the manganese dioxide in powdered form and in a wet condition is mixed with a metallic powder and then pressed into slabs about one inch in thickness, a pressure of about one thousand to two thousand pounds per square inch being employed, or is extruded through a die which may be approximately three fourths of an inch in diameter and constructed in such a manner that ten thousand to twenty thousand pounds are required to cause extrusion. Any other method of compressing the mixture to a coherent body can, of course, be employed. The compressed slabs or extruded threads are then broken into granules about one half to one inch in size, depending upon the apparatus in which they are to be used.

The manganese dioxide preferably employed is the foraminated product prepared in accordance with my Patent 1,937,488, in which a two hundred mesh pyrolusite or other form of manganese dioxide is reduced to the sesquioxide with methanol at a temperature of 200° C., the resulting oxide being leached in a dilute solution of sulphuric acid, filtered, and washed substantially free of soluble sulphates to leave a foraminated manganese dioxide as disclosed in said patent. Prepared in this form, the dioxide contains approximately 30% free water, that is, water which can be removed by drying at 110° C.

The metallic powder is introduced at this point and is preferably copper powder because of its high heat conductivity, although other metallic powders may be employed. The proportions of metallic powder employed may vary within relatively wide limits, but I have found that 50% to 75% is usually more effective, particularly with metallic copper.

The granules resulting from breaking the compressed slabs or extruded threads are then dried at a temperature of 85° to 90° C., preferably in an air circulating drier, until substantially all of the free water has been removed. A time of twenty-four hours is usually sufficient for this purpose. At this stage the catalyst granules are very hard and are ready for reduction. This reduction may be carried on by any of the methods or modifications thereof described above and disclosed in my applications Serial Nos. 4,095 and 9,265, also referred to above.

It is important that the conditions be regulated in such a manner that the reduction will take place at a low temperature. For example, the granules above described may be reduced by a gas containing approximately 75% hydrogen, 1% methane, 23% carbon dioxide, and 1% carbon monoxide at a catalytic bed temperature of 100° C. for two or three hours. The temperature of the catalytic bed is thereafter allowed to gradually increase up to approximately 150° C., a time of about twenty-four hours being required for the total treatment. Reduction at catalytic bed temperatures appreciably above 150° C. renders the oxide inactive. The oxide or catalyst reduced at 150° C. is suitable for oxidizing carbon monoxide from gases containing hydrogen at a temperature preferably between 120° and 130° C. Below 100° C. the reaction is much slower, and the presence of any water vapors greatly reduces the activity of (poisons) the catalyst. Above 175° C. there is danger that hydrogen will begin oxidizing so as to cause the temperature to increase to such an extent that the oxide becomes incandescent and completely reduced.

As a specific example of the production of a catalyst according to this invention, 143 pounds of manganese dioxide prepared from 200 mesh pyrolusite ore in accordance with my Patent 1,937,488, containing approximately 30% free water and which had been reduced to the sesquioxide with methanol at a temperature of 200° C., leached in a solution of sulphuric acid, filtered, and washed substantially free of soluble sulphates, were thoroughly mixed with 100 pounds of copper powder. This is a ratio of approximately 50% dry catalyst and 50% metallic powder by weight. The mixture was pressed into slabs about one inch in thickness under a pressure of one thousand to two thousand pounds per square inch. The compressed slabs were then broken up into granules about one half to one inch in size. These granules were dried at a temperature of 85° to 90° C. for a time of approximately twenty-four hours to produce hard partially hydrated catalyst granules from which, however, substantially all free water had been removed. Sufficient of these catalyst granules were then placed in a converter four inches in diameter to provide a depth of about thirty inches. The converter was equipped with a helical heat exchange coil two inches in diameter with a one and one half inch pitch constructed of one half inch copper tubing, which coil was placed centrally of the converter. Gas containing approximately 75% hydrogen, 1% methane, 23% carbon dioxide, and 1% carbon monoxide was then admitted at the rate of about 25 cubic feet per hour. Steam was then admitted to the heating coil until the temperature, as recorded by several thermometers placed in the center of the catalytic bed, had reached 100° C. After approximately three hours' treatment at this temperature, the temperature was gradually increased up to approximately 150° C. during about twenty-one hours' time. The resulting product was an intimate mixture of copper powder and manganese oxides containing greater than one third of an atom and less than one atom of available oxygen for each atom of manganese and was in the form of hard relatively strong granules.

If desired, the same converter can be employed for the process of oxidizing carbon monoxide in accordance with this invention, although in practice the granules are ordinarily subjected to the low temperature pretreatment in one apparatus and then charged into other apparatus for the production of carbon monoxide free hydrogen.

As an example of the preferential oxidation of carbon monoxide, the above charge of pretreated oxide was retained in the same apparatus, the temperature of the catalytic bed adjusted to between 120° and 130° C., and approximately 90 cubic feet per hour of the same gas used for reduction passed through the catalytic bed along with 0.75% free oxygen. At this temperature and rate of flow of gas, the carbon monoxide is completely oxidized to carbon dioxide without oxidation of hydrogen, and no loss in oxidizing efficiency of the catalyst could be detected after substantially constant operation for a period of three months.

It has been found that the introduction of the metallic powder into the catalyst granules greatly minimizes the development of high temperatures in local areas and permits a much more uniform temperature throughout the catalytic bed because of the increased heat conductivity of the bed. It has also been found that the time necessary to reduce or pretreat the catalyst granules is greatly reduced and that it is not difficult to maintain a low uniform temperature during the pretreatment. Because of the high heat conductivity and high heat capacity of the catalyst, abrupt changes in carbon monoxide content of the gas treated may take place without danger of reaching a local temperature above that at which hydrogen combustion starts such that fluctuations of carbon monoxide content in commercial operations do not start a vicious hydrogen combustion cycle. Also, larger quantities of carbon monoxide can be treated without danger of producing this vicious cycle, and the temperature of the catalytic bed can be more easily controlled by water cooling devices such that gas containing carbon monoxide concentrations, which develop more heat than the gas itself can remove, is capable of being treated. With oxide of the present invention, the gases alone are capable of carrying off the heat due to oxidation of approximately 1% of CO, and with cooling devices this percentage can be increased to twice the amount or more.

The extent to which these advantages are obtained will increase with the per cent of heat conducting powder introduced into the granule and with the heat conducting capacity of the powder employed. However, as the amount of heat conducting powder is increased, the per cent of manganese oxide present is decreased, and a larger catalytic bed is required to treat a given quantity of gas in a given time. A proper balance between these two effects must be maintained, and I have found that 50% to 75% of metallic copper powder is suitable, although other heat conducting powders may be employed and in different proportions in accordance with the properties thereof and the effect desired.

While I have disclosed the preferred embodiment of my invention, it is understood that I am not to be limited to the details thereof, which may be varied to the scope of the following claims.

Having thus described my invention, I claim:

1. The process of substantially completely oxidizing carbon monoxide in the presence of hydrogen without oxidizing substantial quantities of hydrogen, which comprises, contacting gas containing said hydrogen and carbon monoxide with compressed granules including between approximately 50 and 75% of powdered copper and finely divided manganese oxide containing more than one-third atom and less than one atom of available oxygen per atom of manganese, said manganese oxide being prepared by leaching manganous oxide from manganese sesqui-oxide to produce manganese dioxide, and reducing said manganese dioxide with a reducing gas at a temperature between approximately 100 and 175° C.

2. A process of preparing an oxidizing agent for substantially completely oxidizing carbon monoxide in the presence of hydrogen without oxidizing substantial quantities of hydrogen, which comprises, leaching manganous oxide from manganese sesqui-oxide to produce manganese dioxide, mixing said manganese dioxide in finely divided form with approximately 50 to 75% of powdered copper, forming compressed granules of said mixture, reducing the manganese dioxide of said granules with a reducing gas to a manganese oxide containing more than one-third atom and less than one atom of available oxygen per atom of manganese, and maintaining the temperature during said reducing between approximately 100 and 175° C.

3. An oxidizing agent for substantially completely oxidizing carbon monoxide in the presence of hydrogen without oxidizing substantial quantities of hydrogen, which comprises, compressed granules of a mixture of approximately 50 to 75% of powdered copper and finely divided manganese oxide containing more than one-third atom and less than one atom of available oxygen per atom of manganese and prepared by leaching manganous oxide from manganese sesqui-oxide to produce manganese dioxide, and reducing said manganese dioxide at a temperature between approximately 100 and 175° C.

LESLIE G. JENNESS.